INVENTORS
ABRAHAM BROTHMAN
RICHARD DAVID REISER
BY
OSTROLENK, FABER, GERB & SOFFEN
ATTORNEYS

INVENTORS
ABRAHAM BROTHMAN
RICHARD DAVID REISER
BY
OSTROLENK, FABER, GERB & SOFFEN
ATTORNEYS

INVENTORS
ABRAHAM BROTHMAN
RICHARD DAVID REISER
BY
OSTROLENK, FABER, GERB & SOFFEN
ATTORNEYS

INVENTORS
ABRAHAM BROTHMAN
RICHARD DAVID REISER
BY
OSTROLENK, FABER, GERB & SOFFEN
ATTORNEYS

INVENTORS
ABRAHAM BROTHMAN
RICHARD DAVID REISER
BY
OSTROLENK, FABER, GERB & SOFFEN
ATTORNEYS

INVENTORS
ABRAHAM BROTHMAN
RICHARD DAVID REISER
BY
OSTROLENK, FABER, GERB & SOFFEN
ATTORNEYS

INVENTORS
ABRAHAM BROTHMAN
RICHARD DAVID REISER
BY
OSTROLENK, FABER, GERB & SOFFEN
ATTORNEYS

INVENTORS
ABRAHAM BROTHMAN
RICHARD DAVID REISER
BY
OSTROLENK, FABER, GERB & SOFFEN
ATTORNEYS 3,142,726

AUTOMATED SEQUENTIAL INTERROGATION METER READING SYSTEM OVER TELEPHONE LINES

Abraham Brothman, Dumont, N.J., and Richard David Reiser, Port Jervis, N.Y., assignors, by mesne assignments, to Transitel International Corp., Paramus, N.J., a corporation of New Jersey Filed Feb. 23, 1961, Ser. No. 91,043
15 Claims. (Cl. 179—2)

Our invention relates to an automatic reading system and more particularly to a meter reading system having novel means which permit utilization of existing telephone links.

Utility meters, namely, meters of the gas, electricity and water variety are presently being used by the utility companies as the means by which the rates for each customer are determined. Meter readings are taken by employees of the utility company which dispatches the meter readers to the customers homes on a periodic basis such as, for example, once a month.

Attempts have been made to replace this manual operation with a automated system which has the same degree of reliability as the manual operation presently in use.

One system which has been proposed is the transmission of the particular meter reading by wireless means. This proposed system consists of a means for converting the meter reading into coded pulses, a transceiver at the customer's location for receiving a request pulse from the central office and subsequently transmitting the coded meter reading and, finally, a transceiver at the central office for sending the request signal and subsequently receiving the coded meter reading from the customer location. The communication medium may be either a powerline carrier communications system superimposed on a power grid; or a mobile central office in the form of a cruising truck equipped to "selectively ring" and receive by radio. Although this proposed system is feasible from the standpoint of operativeness, the basic installation cost of such a system makes it highly impractical from the standpoint of economics.

Another proposed system would replace the wireless transceivers utilized in the system proposed immediately above by installing either underground or overhead wires between each customer location and the utility companies' central offices. This proposal is likewise highly impractical due to the enormous installation cost involved in setting up the necessary transmission lines.

It can be seen, therefore, that the problem which exists is one of replacing the manual meter reading operation by a fully automatic system with the necessary requirement that the cost of the fully automated system is in line with the cost of the manual operation presently in use.

Another proposed system consists of utilizing existing telephone lines as the transmission medium thus avoiding the necessity of placing wireless transmitters and receivers at each customer location. A system of this type is set forth in United States Patent No. 2,870,258 entitled "Automatic Meter Reading System." Each meter reading is taken by initiating the call through the telephone dialing system in order to reach each customer installation. The proposed system, therefore, requires a large amount of call initiating equipment at the billing and account center of the utility company. In addition, each call requesting the data reading is the equivalent of a regular telephone call from the standpoint of the telephone system services thereby requiring a large amount of time for the dialing operation.

In addition, the cost of each "call" increases the operating expense of the system. If the meter reading device and transmitter are "piggybacked" to the subscriber line used for the normal telephone facility, the reading request call may also interfere with calls being placed by the customer thereby requiring a memory system in order to remember the numbers of customers whose telephone receivers were in use at the time the call requesting the meter reading was placed. It is possible, however, to place the meter reading request calls in the early hours of the morning where normal telephone service is at a minimum. However, each reading request call placed causes the customer's receiver to emit its characteristic ring thereby having a disturbing effect upon the customer. In order to avoid the ringing of the subscriber's telephone, a separate line may be used for the meter reading equipment. This has the disadvantage of requiring a new line for each subscriber which makes the cost of the system prohibitive.

Existing lines may be piggybacked by having a separate call code and response capability for each subscriber line which is so adapted as not to actuate the ringing circuit of the subscribers' telephones. This arrangement, however, requires additional telephone switching equipment which can distinguish between the separate call codes and energize the subscriber line accordingly.

Our invention permits meter readings to be taken automatically, using the telephone network as the transmission medium, but is so arranged as to avoid the need for initiating a telephone call in order to take each reading. Our novel invention takes advantage of telephone line checking circuits presently being used in telephone systems. Test circuits of this type are utilized to check one subscriber line at a time by imposing a resistance and voltage breakdown test upon each line of the telephone network.

The test circuits are designed to automatically skip subscriber lines which are in use. The test sequence is placed in operation at a time when telephone service is at a minimum so that an extremely small number of lines need be skipped. The meter reading request for skipped lines may be made at a later time when the test sequence for the network is being repeated.

Our invention consists of a transmitter placed at each customer installation which converts the meter dial reading into a train of coded pulses. The pulse train is associated with the particular telephone line where a receiver picks up the pulse train and contemporaneously relays the data by means of a Dataphone facility to the utility company billing and dispatch center. The Dataphone is a connecting link which is employed to transmit binary coded data at superphonic speeds. The Dataphone is a frequency shift tone device with a predetermined keying rate capability which is more fully described in the Series SP-34 publication by the Dataphone Service of the American Telephone and Telegraph Company. Alternatively, the receiver may be arranged to activate a tape punch which records each meter reading in punch code on a paper tape. This may be done when a Dataphone facility is either unavailable or is available on a time sharing basis. Other storage means may be employed in place of the tape punch such as, for example, a magnetic tape, a magnetic drum or a magnetic core storage means. The system utilizes the automatic line insulation test circuitry of the telephone system (commonly known as ALIT).

This test circuitry is now widely used through the country. The test circuitry consists of a standard cross bar switch system which is utilized to perform a resistance test and a breakdown voltage test upon each subscriber line in the network. The essential aspects of the ALIT are that: it contains the means of scanning every subscriber line in a central office in a fixed sequence; it enables a test source at the common arm of the scanning switch to apply a test sequence to each scanned point; it is interlocked with the selective dialing equipment in such a fashion that "busy lines" are skipped. The test source of the common arm most usually applies D.C. test voltages only. However, some ALITs also apply A.C. test signals as well.

The majority of telephone installations presently in use employ a D.C. voltage level on the subscriber lines. The audio intelligence is transmitted between subscribers by acoustical or other modulation of the D.C. loop current. The normal telephone service utilizes signals of either the alternating current type, or D.C. pulses which are impressed on the subscriber line D.C. current loop to energize the ringing circuit. The breakdown voltage employed in the test sequence merely places a D.C. voltage at a level higher than that existing on the subscriber line and it is this increased voltage level to which the meter reading equipment responds. The D.C. voltages employed in the test sequence therefore, do not cause the telephone to emit its characteristic ring thereby avoiding any disturbance to the customer while the meter reading is being transmitted.

The test sequence is initiated by the crossbar or stepping switch which is energized in such a manner as to cause the cross bar switch matrix to scan each subscriber line in serial fashion until all subscriber lines associated with the cross bar switch matrix have been tested. Each subscriber line is connected to the test circuitry for a period sufficient to perform the test sequence. Additional circuitry is provided so that subscriber lines which are presently being used by the customer are automatically skipped over thereby preventing any interference between the meter reading request and the call being placed by the customer. The test circuitry is further arranged to drop out if the subscriber raises his hand set while the test is being applied. The resistance test and the breakdown voltage test, however, are normally performed during the early morning hours so that very few subscriber lines need be skippped over since this is the one period of the day when telephone service is at a minimum.

A receiver is placed at the telephone central office and is electrically linked with the telephone test circuitry in order to receive the binary coded information from the customer installation, which coded information represents the meter reading of the installation. In cases where the central office stores received data, the receiver at the telephone central office includes circuitry for performing a parity check and a coincidence check upon the meter reading which has been transmitted. These check circuits insure the fact that the coded pulses which have been transmitted are correct thereby reducing the possibility of error.

The automated meter reading system is so designed as to permit a reading to be taken from any one customer installation within the time necessary to perform the resistance and breakdown voltage tests being performed on the associated subscriber's line. This arrangement permits the test circuitry presently being used in telephone systems to be combined with the automated meter reading system without the necessity of any modifications to the telephone system test circuitry. The only new function which the test circuitry must perform is that of transmitting a signal to the receiver of the meter reading system to apprise the receiver of the fact that the test sequence is about to be initiated. Holding circuitry means are also provided for locking the test circuitry sweep circuit in one particular subscriber line if more time is required for the transmission of meter readings. For example, if one subscriber line is utilized to transmit meter readings for a plurality of meters the holding circuit locks the cross bar switch upon the particular subscriber line until all of the meter readings are transmitted. Upon completion of the transmission the sweep circuit resumes control of the cross bar switch.

The meter reading system disclosed herein is not limited in its application to the reading of utility type meters, but is sufficiently flexible so that it may be employed in any system which utilizes a meter (or meters) for indicating the status or condition of the system. For example, meter readings may be taken in automated processing systems which employ meters to indicate such things as temperature, pressure, thickness, operating time, down time, etc. In such systems it becomes necessary to make periodic checks upon various phases of the system at a point which is remote from the central control board. These checks may be performed automatically by the employment of our meter reading system.

Our automated meter reading system may also be employed in subscriber TV systems wherein meters are installed with TV receivers for indicating the amount of time subscription programs have been received by the individual customer.

The system of our invention also has utility in supermarkets or department stores which employ meters for indicating the inventories of each item stocked by the store. The indicating meters may then be automatically checked in order to determine which items must be replenished. Our system may also be used to read meters which record the amount collected by coin operated machines in order to determine such things as when the machine should be emptied, whether the machine is economically feasible in its present location; and when the items dispensed by the machine have been depleted.

Our invention may further be utilized in any system which employs condition sensing means of a broad nature and as such is not limited strictly to condition sensing means of the meter type which are designed to provide visually readable indications since the underlying feature of our system is the transmission of coded data derived from a condition sensing means either electrically or mechanically. Photoelectric sensing means, however, may be employed as the transfer means between the condition sensing means and the coded data transmitter.

It is, therefore, one object of our invention to provide an automatic meter reading system having a novel arrangement enabling the meter reading system to take advantage of existing telephone lines.

Another object is to provide an automatic central information gathering system which uses existing telephone lines whereby the central point initiates the request for information having minimum conflict with primary purpose of the existing lines.

A still further object is to provide an automatic central information gathering system which initiates information request by means other than the means for which the lines are primarily used.

Another object of our invention is to provide a data gathering system having a central point connected to remote locations by existing telephone lines wherein the data transmission is superimposed upon the normal line test sequence.

Another object of our invention is to provide a novel automatic information gathering system utilizing existing telephone lines which is arranged to automatically avoid interference with telephone lines which are placed in operation by telephone subscribers.

Although the automatic line insulation test circuitry is best employed to simultaneously perform the test sequence and initiate the meter reading sequence, the significant aspect of the system is the initiation of a metering reading operation by a facility (the central office) which was heretofore utilized as a slave device which connected one subscriber location to another at the request of the subscriber. The unique arrangement of the instant application permits the central office to initiate the meter reading sequence without a subscriber line request. Thus, a scanning circuit of the crossbar or stepping switch type is all that is required at the telephone central office as long as it is able to "look-in" on each subscriber line and apply a voltage which is designed to energize the meter reading equipment and not interfere with the telephone ringing circuit. This may be done by using the D.C. voltage as described above or by utilizing an A.C. waveform which has a frequency substantially greater (or smaller) than the frequency to which the subscriber telephone is attuned. With regard to the ultimate intention of the Telephone Company to put the entire message network (inclusive of subscriber lines) on an A.C. transmission mode, the system will be suited to such a changeover as well. This can be regarded as a special virtue of the system, namely its ability to be matched into any modernization program of the Telephone Company as well as its compatibility with present practices.

Another object of our invention is to provide an automatic meter reading system having novel means to transmit and receive information in the form of coded pulses.

Still another object of our invention is to provide an automatic meter reading system which is so arranged as to employ unique voltage patterns which do not interfere with normal telephone operations.

These and other objects of our invention will be apparent from the following description of the drawings in which:

FIGURES 1*a* and 1*b* comprise a schematic diagram of the automatic meter reading system.

Figure 4A:
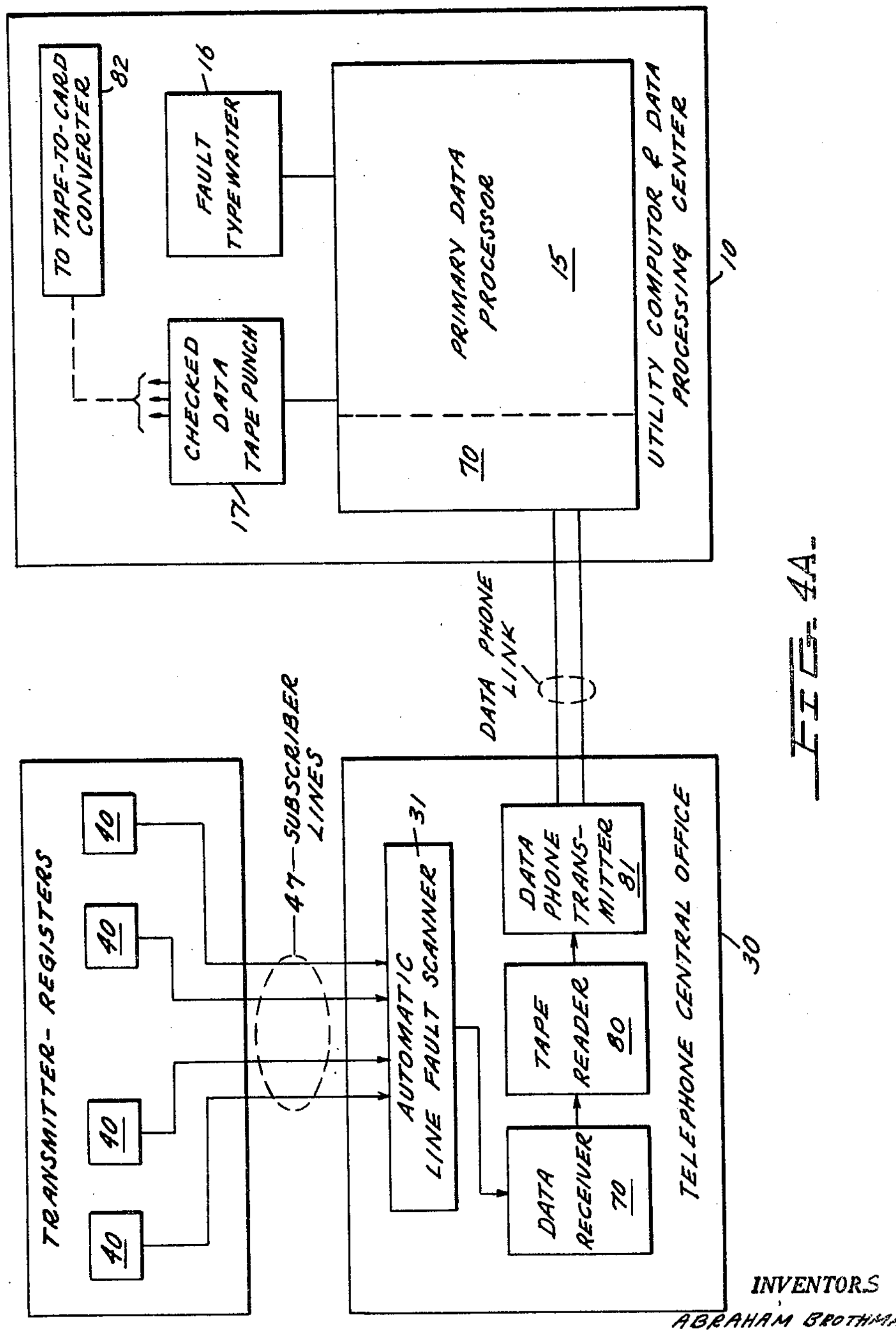
Figure 4B:
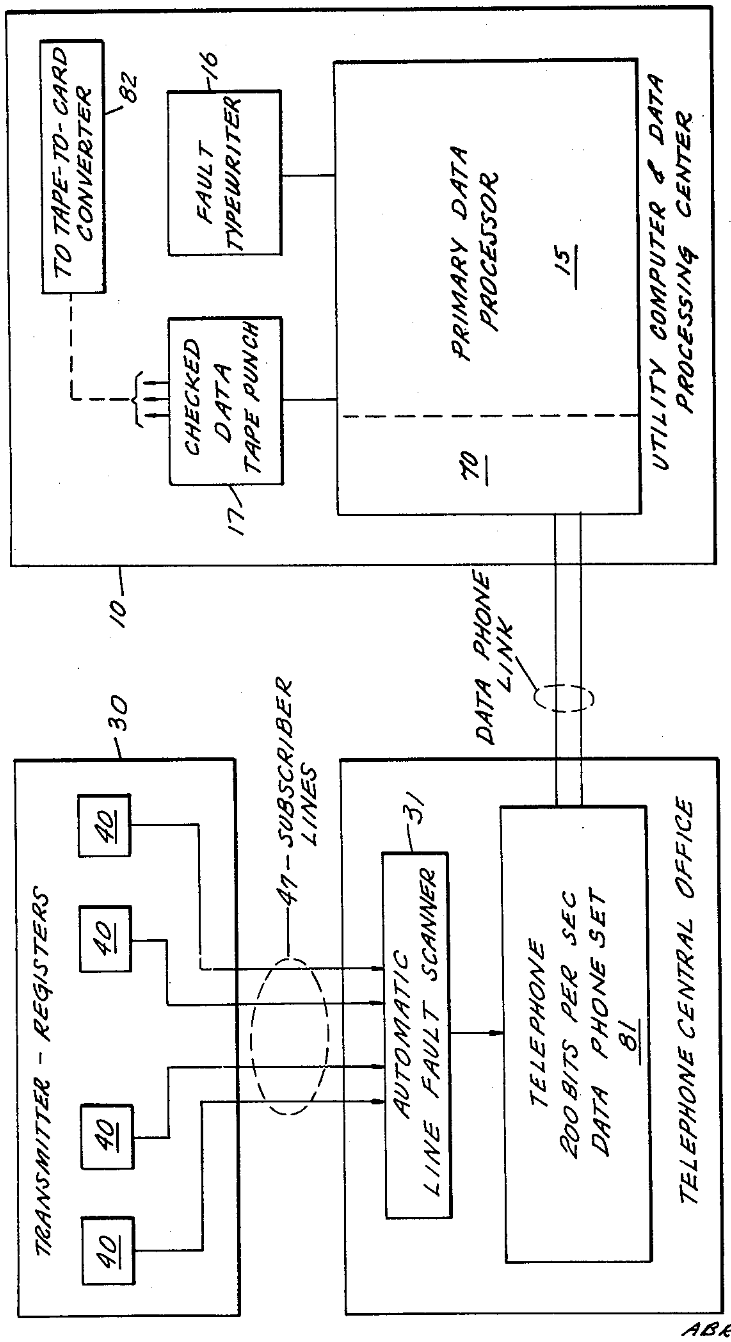

FIGURES 4*a* and 4*b* are schematic diagrams showing two methods of transmitting data from the telephone central exchange to the utility company processing center.

Figure 5:
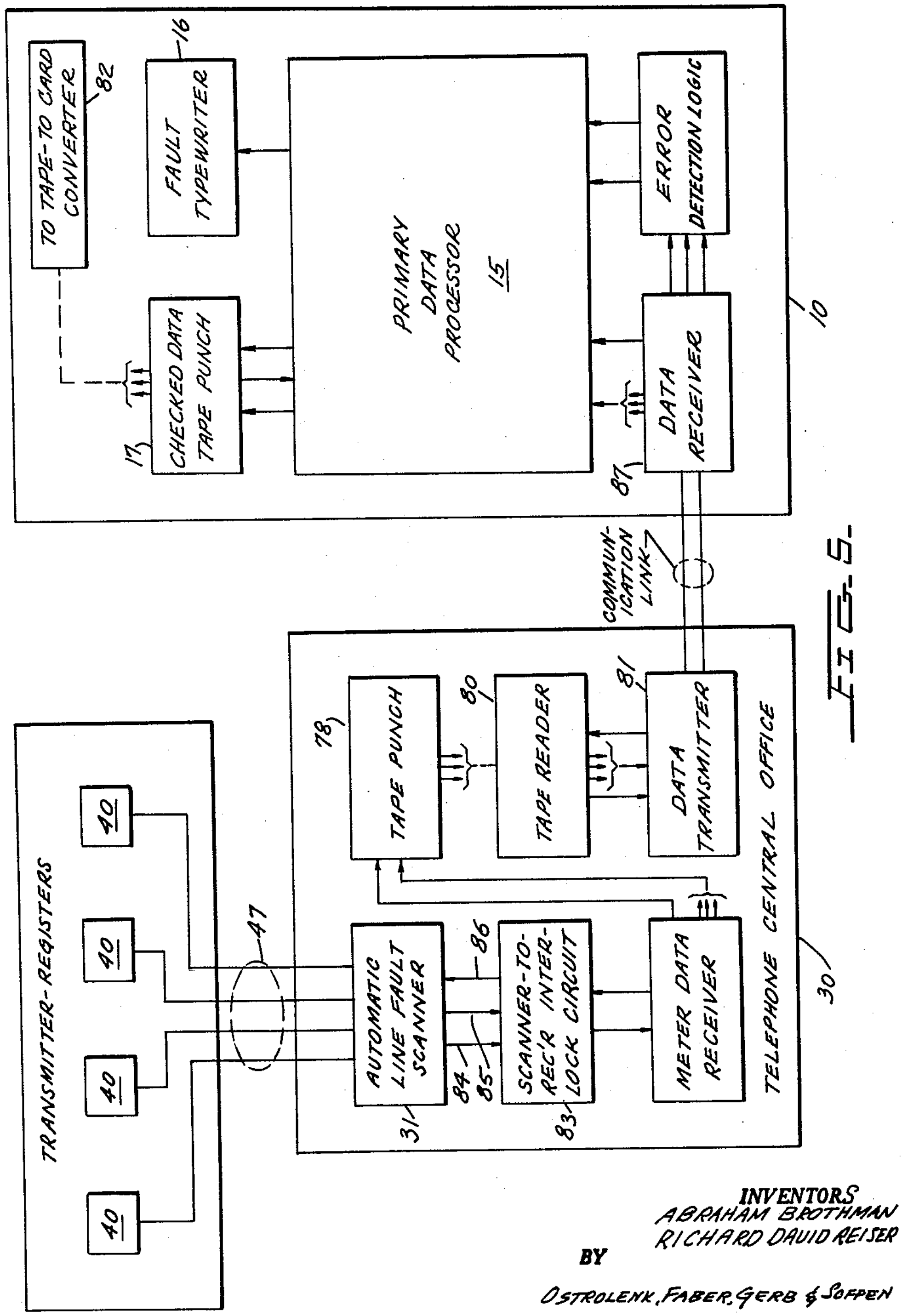

FIGURE 5 shows the telephone central exchange and utility company processing center of FIGURE 4*a* in greater detail.

Figure 6:
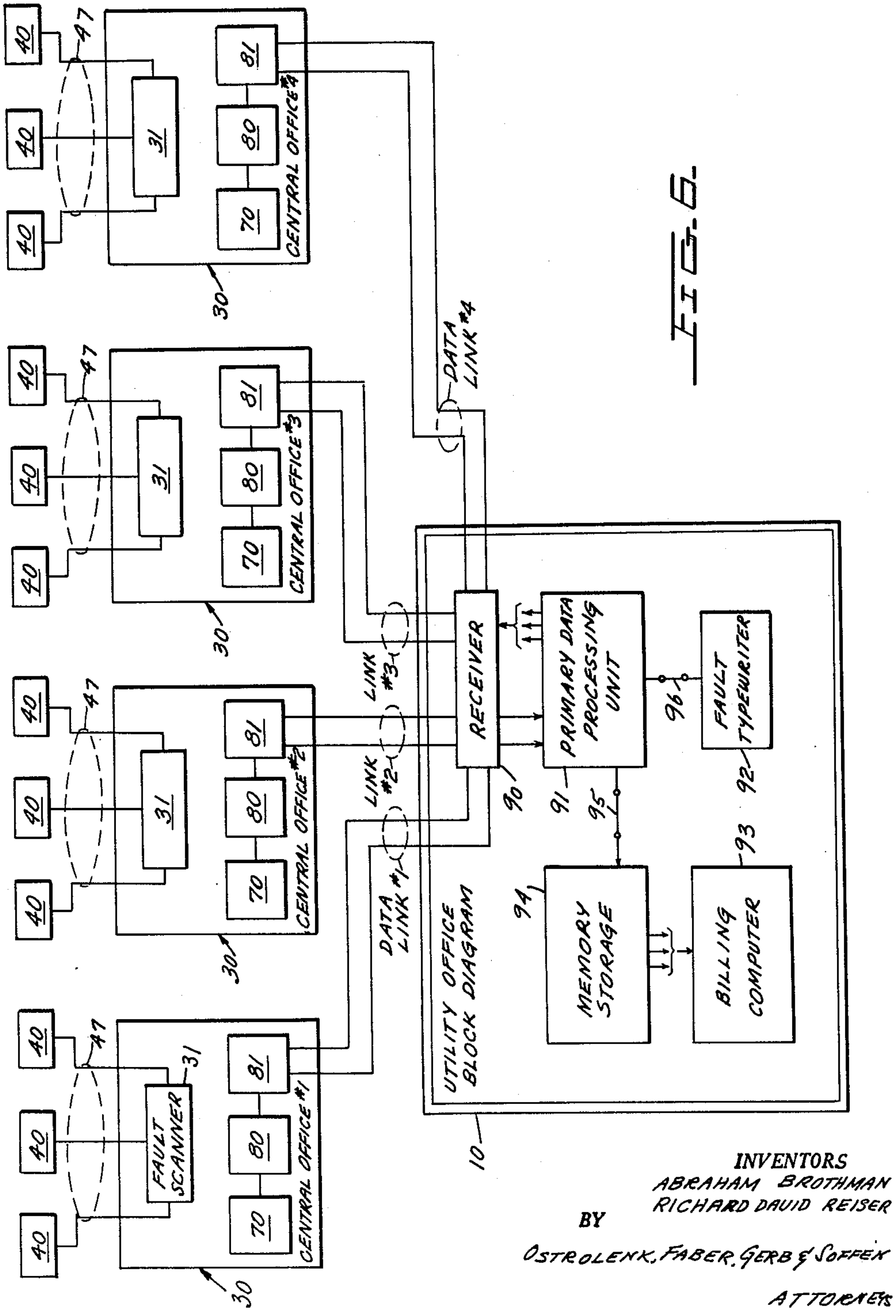

FIGURE 6 is a schematic diagram showing the manner in which a plurality of telephone central exchanges are linked to the utility company processing center.

Figure 1A:
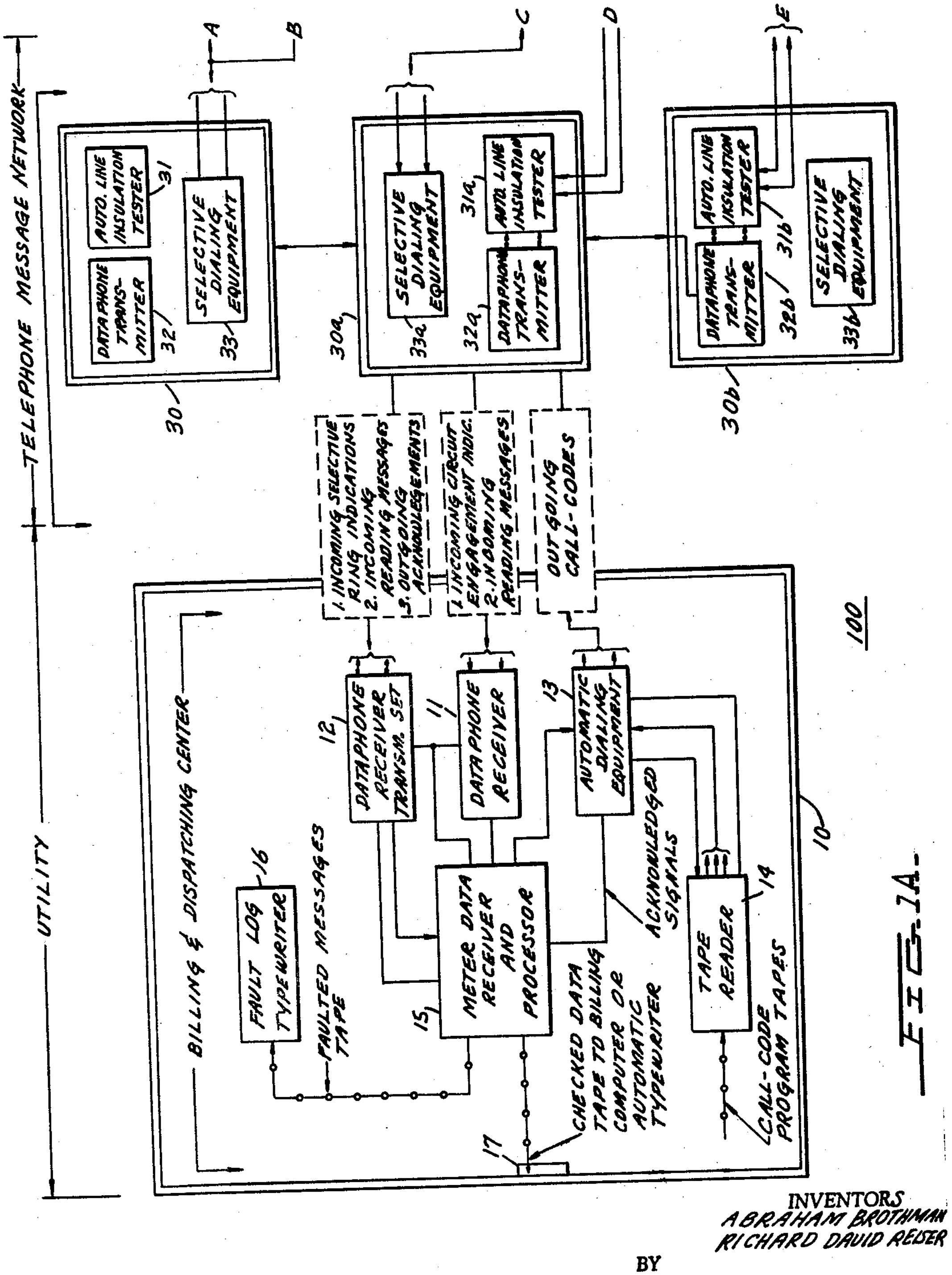
Figure 1B:
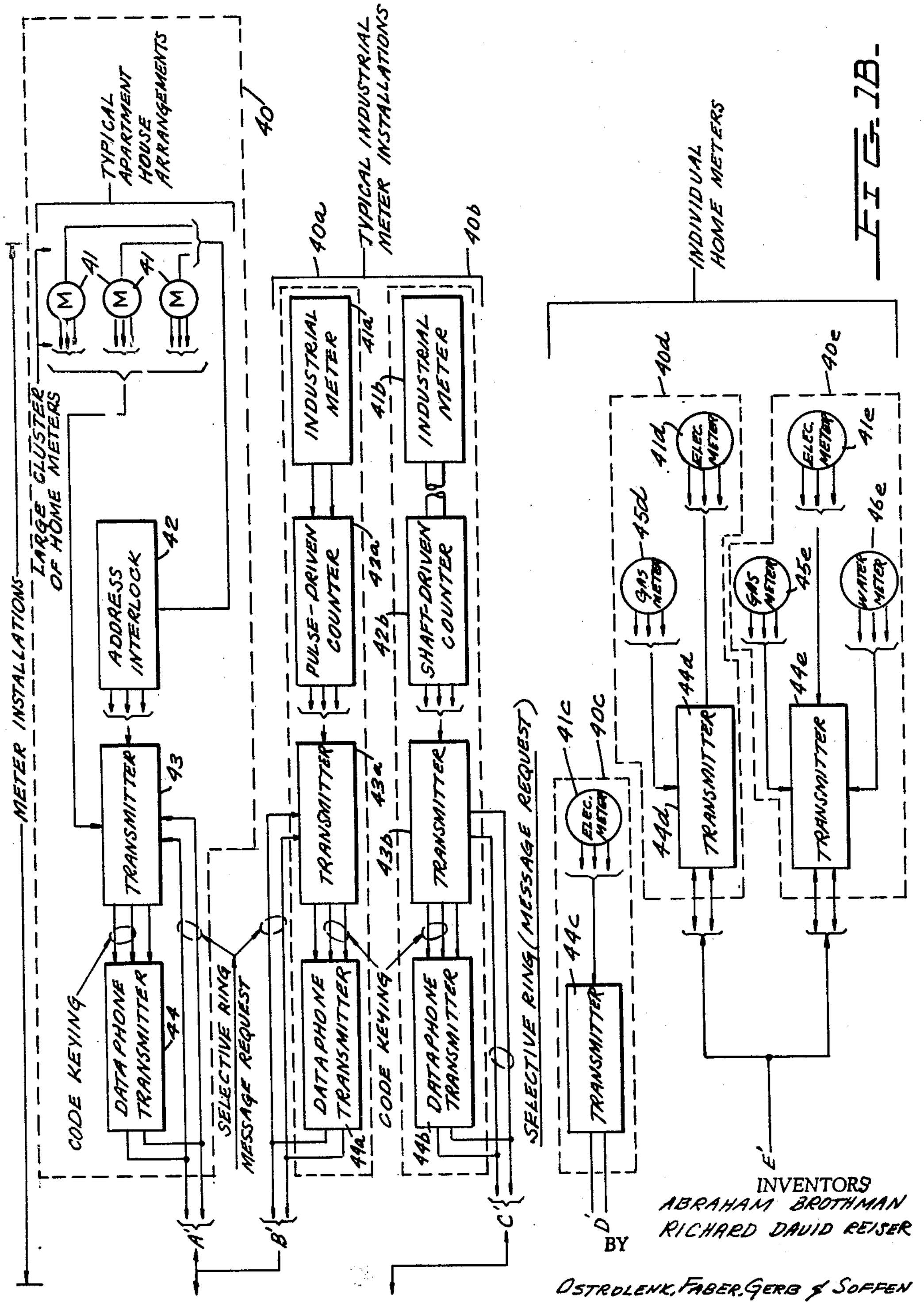
Figure 2:
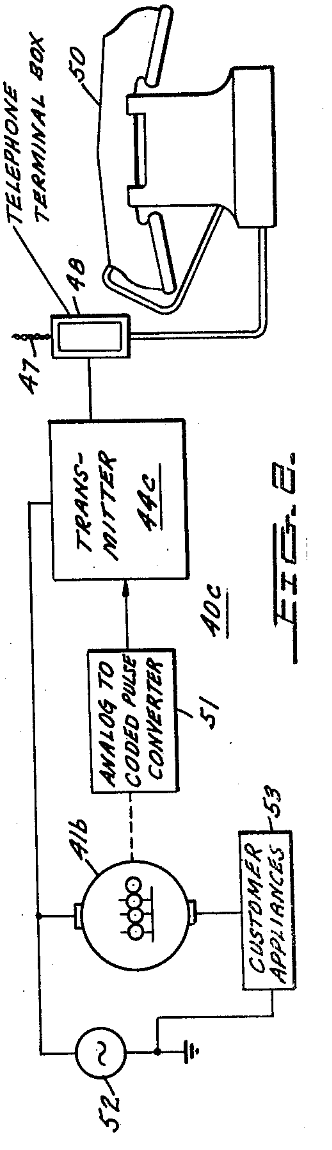
FIGURE 2 is a schematic diagram of the transmitter portion of the meter reading system shown in FIGURE 1.
Figures 7, 8:
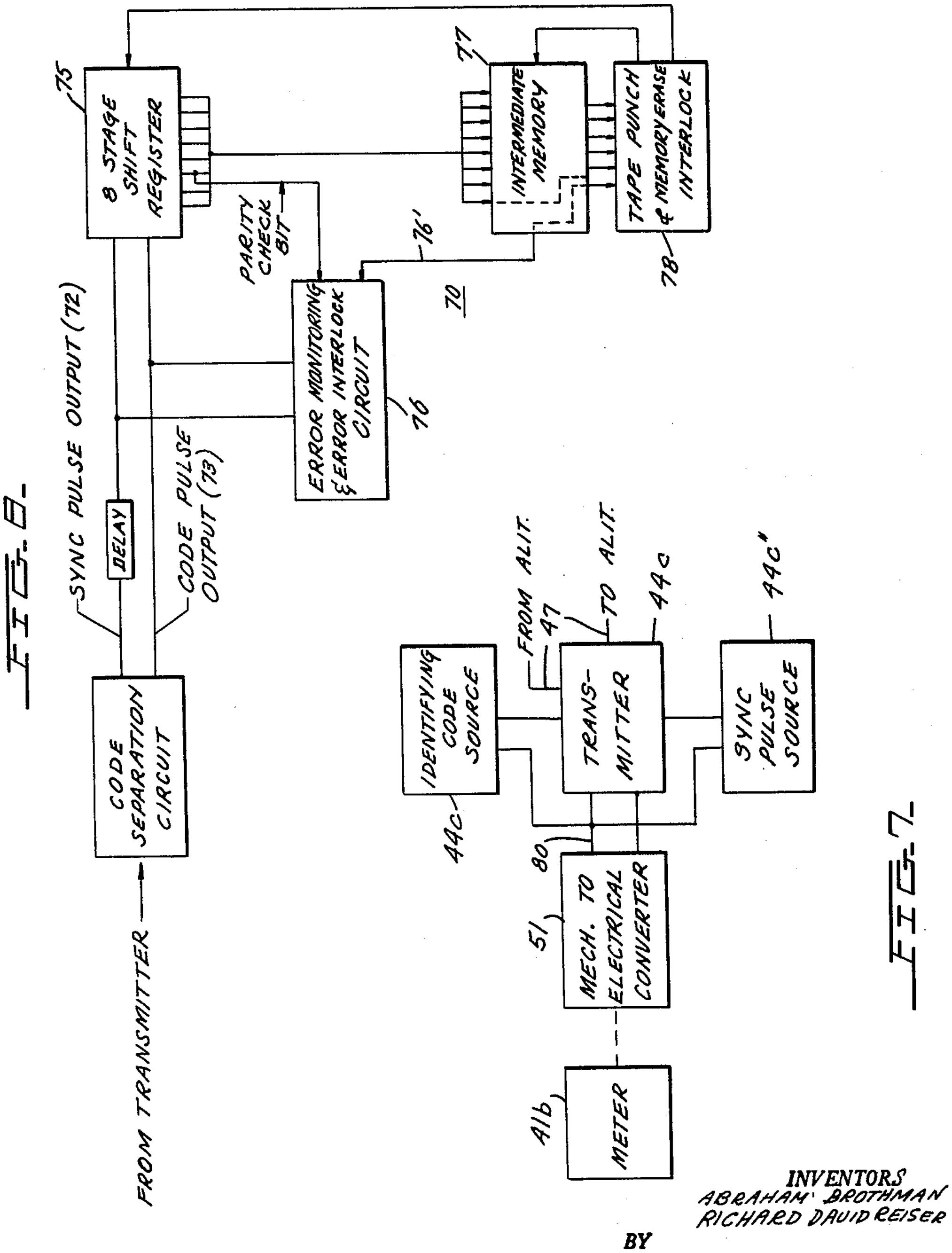

FIGURE 7 is a block diagram of the transmitter of FIGURES 1 and 2.

FIGURE 8 is a block diagram of the receiver shown in FIGURES 1 and 5.

Referring now to the drawings, FIGURE 1 shows the automatic meter reading system 100 which consists of a billing and dispatching center 10, telephone central offices 30, 30*a* and 30*b* and the meter installations 40 through 40*e* at the customers' locations. The type of installation at the customer location varies depending upon the service required by the particular customer. A typical apartment house installation 40 is comprised of the individual meters 41, address interlock means 42, code transmitter 43 and data phone transmitter 44.

The installation 40*a* for a typical industrial application consists of the customer's meters 41*a*, counting means 42*a*, transmitter 43*a* and data phone transmitter 44*a*.

A typical family house installation 40*c* consists of meter 41*c* and transmitter 44*c*. Home installations 40*d* and 40*e* differ from home installation 40*b* in that transmitters 44*d* and 44*e* are adapted to transmit the readings of a plurality of utility meters in a manner to be more fully described, transmitter 44*d* being adapted to transmit the readings of an electric meter 41*d* and a gas meter 45*d* while home installation 40*e* consists of transmitter 44*d* which is adapted to transmit the readings of electric meter 41*e*, gas meter 45*e* and a water meter 46*e*.

The telephone central exchange link of the automated meter reading system 100 consists of the central offices 30, 30*a* and 30*b* associated with meter installations 40, 40*a*, 40*b*, 40*c* and 40*d*, 40*e*, respectively. Each central office consists of a data phone transmitter 32, 32*b*, selective dialing equipment 33, 33*b*, and automatic line insulation test circuitry 31, 31*b*. The interconnections between the central offices and the meter installations vary depending upon the type of meter installation with which the central offices are linked as will be more fully described.

The billing dispatching center 10 consists of a data phone receiver 11, data phone transmitter 12, automatic dialing equipment 13, tape reader 14, data processer 15 and fault log typewriter 16.

The basic message network of telephone systems presently in use consists of central offices 30, 30*b* having a plurality of associated subscribers such as subscribers 40, 40*e* respectively, surrounding their associated central office. Although only a few subscribers are shown connected to their associated central exchanges it should be understood that each central exchange is capable of handling a large number of subscribers, such as, for example, 10,000 subscribers.

Each central office is the center from which the dialing option is granted, to which dialing is directed in initiating a call, from which central office to central office selective switching is developed, and into which the terminal codes of a call code go to select the desired party. The central offices 30 to 30*b* are also the central point from which the test sequences and maintenance work upon individual subscriber's lines are carried out. It is through the automatic line insulation test circuitry 31, 31*b* of each central office 30 to 30*b*, that the meter reading sequence is initiated.

The automatic line insulation test circuitry supplies the access means by which subscriber lines requiring once per month access are read. Party or private subscriber lines together with the ringing of these lines through the regular dialing equipment is the access means for reading meters with random or high frequency access requirements. Since the automatic test circuitry is used as an "off peak" maintenance check the telephone system equipment is tied up only during the minimum usage or "graveyard" hours of the day. This enables the data processing portion of the system to operate during the daylight or evening hours to collect data by the conventional dialing option thus smoothing the operation of the meter reading system to avoid any necessity for operating under a peak load requirement.

Since the test circuitry employed by the telephone company is operated during off-peak periods, the meter reading system earns itself a preferred tariff thereby diminishing the overal operating cost. For central offices which have heretofore not been equipped with the automatic test circuitry, the telephone company is enabled to amortize such maintenance improvement equipment by the meter reading income.

The meter reading operation employed for the reading of meters installed at a typical home such as the installations 40*d* and 40*e* is as follows:

The automatic line insulation test circuitry 31*d* of central office 30*b* commences its subscriber line tests sequence by means of a stepping switch or cross bar switch which is driven at the rate of one subscriber's line at a time in order to perform the resistance and voltage breakdown tests. When a subscriber's line, for example, subscriber 40*d*, is connected to the stepping or cross bar switch of test circuitry 31*b*, the test sequence for that subscriber line is initiated. The resistance test is performed first. The voltage breakdown test is then performed by impressing a D.C. voltage level upon subscriber line 40*d*. This D.C. voltage level acts as a step voltage which is impressed on the already existing D.C. current loop and is a sufficient step increase to initiate the operation of transmitter 44*d* at home installation 40*d*.

Transmitter 44*d* responds to the D.C. voltage level impressed upon test circuit 31*d* by transmitting a code which identifies the meter being read and subsequently transmitting the coded meter reading of the gas meter 45*d*, for example.

The stepping switch or cross bar switch of test circuitry 31*b* is then stepped to the next subscriber's line such as, for example, subscriber's line 40*d* whereupon transmitter 44*e* of subscriber line 40*e* responds to the D.C. voltage level impressed upon the subscriber line 40*e* by transmitting the identifying code and coded meter reading of meter 45*e* in the same manner as transmitter 44*d* of subscriber line 40*d*.

For meter installations at which readings are taken at rather frequent periods it becomes economically feasible to utilize the selective dialing equipment at the central office in order to initiate the meter reading request. The selective dialing equipment 33*a* of central office 30*a* is utilized to initiate transmission of the meter reading of industrial installation 40*b*. The industrial meter 41*b* representing the type of installation having meters which must be read at rather frequent intervals.

The meter reading operation for an industrial installation is as follows:

Selective dialing equipment 33*a* initiates a call to subscriber 40*b* which energizes transmitter 43*b*. Transmitter 43*b* transmits the identifying code for subscriber line 40*b* and subsequently the coded pulses which represent the meter reading of industrial meter 41*b*. Shaft driven counter 42*b* converts the shaft positions of industrial meter 41*b* into electrically coded information which are transferred in parallel fashion to transmitter 43*b*. The output of transmitter 43*b* is impressed upon data phone transmitter 44*b* which converts the D.C. pulses from transmitter 43*b* into a modulated A.C. signal which is then transmitted to central office 30*a* where it is relayed by the selective dialing equipment 33*a* to either a local tape punch (not shown) or the billing and dispatching center 10 by a Dataphone link such as Dataphone 12.

Subscriber line 40*a* differs from subscriber line 40*b* in that counter 42*a* receives an electrical pulse from industrial meter 41*a* for each unit quantity of meter flow and converts this input into a digital coded output whereas the counter 42*b* of subscriber line 40*b* converts a mechanical analog input to coded digital information. Except for this one distinction subscriber line 40*a* operates in the same manner as subscriber line 40*b*.

Apartment house installations such as installation 40 may also be linked to the central office 30 by means of a data phone transmitter which becomes feasible since a large number of meters may be read with the placing of only one "call." The selective dialing equipment 33 of central office 30 is utilized to initiate the meter reading request which request signal energizes transmitter 43. Transmitter 43 then transmits to data transmitter 44 the identifying code and the coded meter reading of the particular meter 41 whose reading is requested by selective dialing equipment 33. The apartment house installation 40 requires only one transmitter 43 to read all the customer meters in the apartment house. An address interlock circuit 42 is provided between the meter 41 and transmitter 43. The address interlock circuit 42 transmits the identifying code of the meter being read to transmitter 43.

Interlock means 42 may consist of a 26 deck stepping switch arranged to form an "($n$) throw positions to single-pole" switch at each deck. By means of one of these decks, one side of the keying loop is time-shared among ($n$) encoders belonging individually to ($n$) meters 41. By means of the remaining 25 decks, a 5-character 5 bits-per-character address is developed, one deck being employed for each meter. Accordingly, as each meter encoder is selected, the corresponding address is applied to the time-shared transmitter 43.

The interlock circuit 42 enables the meters 41 to transmit their readings through only one transmitter 43 thus resulting in a large saving of equipment for apartment house installations or for any installations having more than one meter.

The identifying code and the coded meter reading for the subscriber's line being read is impressed upon data phone transmitter 44 by transmitter 43. Data phone transmitter 44, which utilizes the A.C. transmitting mode, conveys the coded reading to central office 30.

The central offices may be arranged to transmit the coded meter readings received from the subscriber lines directly to the billing and dispatching center 10, as is shown with reference to central office 30*a*, or central offices may be designed to transmit the subscriber line meter readings to another central office such as shown with reference to central offices 30 and 30*b* which are arranged to transmit the received data to central office 30*a* which then relays the readings to billing and dispatching center 10.

The coded meter readings are received at billing and dispatching center 10 by means of data phone receiver 11 which transfers the received data to data processor 15. Data processor 15 has a code receiving and storing capability, a character-by-character error monitoring capability, a word-level error monitoring capability which is applied to the address-and-reading word, and a gating capability by which errored data sentences are directed through a fault channel to fault log typewriter 16. All valid data is directed through a checked data channel to billing typewriter 17. Both channels are equipped with tape record equipment. The fault channel in particular terminates in an automatic logging typewriter 16 by which a "hard copy" is prepared of the faulted sentences. A card-reading auxiliary is included in the processor 15 and is paced by the processor for address-check and number-of-readings-from-each-metering-point comparisons is co-ordinated with the processor 15.

Data processor 15, upon receipt of the coded readings from central offices 30–30*b* energizes data phone transceiver set 12 which transmits an acknowledgement to central offices 30–30*b* apprising the central offices that the meter readings have been received allowing the automatic line insulation test circuitry 31–31*b* to renew its stepping operation.

The billing and dispatching center 10 may initiate meter reading requests for customers linked with central offices through data phone transmitters such as customer installations 40, 40*a* and 40*b*. This is done by placing a call code program tape in tape reader 14 which is arranged to control automatic dialing equipment 13 to transmit meter reading requests to customer installations having data phone links.

FIGURE 2 shows the customer installation 40*c* which is utilized for reading an electric meter 41*b*. Subscriber lines 47 which are connected to the central office such as, for example, central office 30*a* of FIGURE 1, terminate at the telephone terminal box 48. Telephone receiver 50 is connected to subscriber lines 47 at terminal box 48. Transmitter 44*c* is connected in parallel with the subscriber lines 47 at terminal box 48 and is arranged to be energized by the voltage breakdown test performed on subscriber lines 47 by the automatic line insulation test circuitry 31*a* (see FIGURE 1). It can be seen from FIGURE 2 that the interconnections between the telephone network and the transmitting equipment can be performed with relative ease and add no complexity to the telephone network.

The electric power company source is shown schematically at 52. Electric meter 41*b* and subscriber's appliances 53 are connected in series with the power source 52. Block 53 represents the load at customer's home which includes such things as electric lights, electrical appliances, and so forth.

An analog to binary coded information converter 51 is mechanically linked to electric meter 41*b*. Analog-to-digital converter 51 converts the shaft positions of each dial of electric meter 41*b* into a combination of parallel binary bits which are arranged to represent any decimal digit from zero through nine.

Upon the receipt of a meter reading request, i.e. the D.C. step voltage, transmitter 44*c* becomes energized under control of the voltage breakdown test impressed upon subscriber line 47. Transmitter 44*c* then transmits a group of binary coded bits which represent the identifying code for subscriber line 40*c*. This code may represent the serial number on meter 41*b*, for example. However, any other identifying code may be used. Transmitter 44*c* then transmits the meter reading by converting the parallel bits from analog converter 51 into serial bits which are then transmitted through subscriber lines 47 to the central office such as central office 30*a* of FIGURE 1, for example.

The coded bits representing the meter identification number and the meter reading are combined with synchronizing pulses in transmitter 44*c*. The timing of the synchronizing pulses is arranged so that one synchronizing pulse precedes each bit position of the binary bits which make up the identification and meter reading characters. The synchronizing pulses are then combined with the code pulses and transmitted through subscriber lines 47 as one serial pulse train. The synchronizing pulses provide the means for synchronizing the transmitter 44*c* with the data receiver which is shown in FIGURE 8 in a manner to be more fully described. This feature can best be seen in FIGURE 3 which shows the meter reading and identifying code, the data pulse train 60, the synchronizing pulse train 61 and the resultant pulse train 62, where the pulses of pulse train 60 are represented by dotted lines 64 and the synchronizing pulses of waveform 61 are represented by solid lines 63. The data pulse train 60 is comprised of a five decimal digit meter identification number binary representation 65 followed by a four decimal digit meter reading binary representation 66. The meter identification binary pulses 65 of the data pulse train 60 represent the decimal number 36480 and the meter reading binary coded pulses 66 of the data pulse train 60 represent the decimal reading 5971. Each binary coded character such as character 67 consists of a start pulse S followed by four binary bits 68 which represent the decimal characters 1, 2, 4, and 8 respectively. The next binary bit 69 of each character 67 represents a parity check bit P to be more fully described. The remaining binary bit 70 of each character 67 is not important in the description of the pulse train and a discussion of the functions this bit performs need not be set forth since it lends no novelty to the invention of this application.

It can be seen from the pulse train 62 that the presence of a data pulse between two pulses 63 represents a binary "one" whereas the absence of a data pulse 64 between two synchronizing pulses 63 represents a binary "zero."

Utilization of the synchronizing pulses 61 in pulse train 62 provides the means for operating transmitter 44*c* and receiver 70 of FIGURE 8 in exact synchronism in a manner to be more fully described.

FIGURE 8 shows the data receiver 70 which is employed to receive the pulse train 62 from the meter reading transmitter such as transmitter 44*c* of FIGURE 2. Data receiver 70 consists of a code separation circuit 71 which receives the pulse train 62 shown in FIGURE 3 from the data transmitter and separates the pulse train so that the synchronizing pulse train 61 of FIGURE 3 appears at outputs 72 and the binary coded data pulse train 60 of FIGURE 3 appears at output 73. The pulse trains appearing at outputs 72 and 73 are impressed upon shift register 75, the data pulse train on line 72 passing through delay means 74 before being impressed upon shift register 75, for a purpose to be more fully described. Outputs 72 and 73 are also impressed upon the input of error monitoring and error interlock circuit 76 which performs a parity check and coincidence check upon the incoming data. Shift register 75 has a storage capacity equal to the number of binary bits making up each character such as the character 67 shown in FIGURE 3. Intermediate memory 77 has its input connected to the output of shift register 75 and is utilized to transfer a binary coded character 67 (see FIGURE 3), one character at a time, to tape punch 78.

Figure 3:
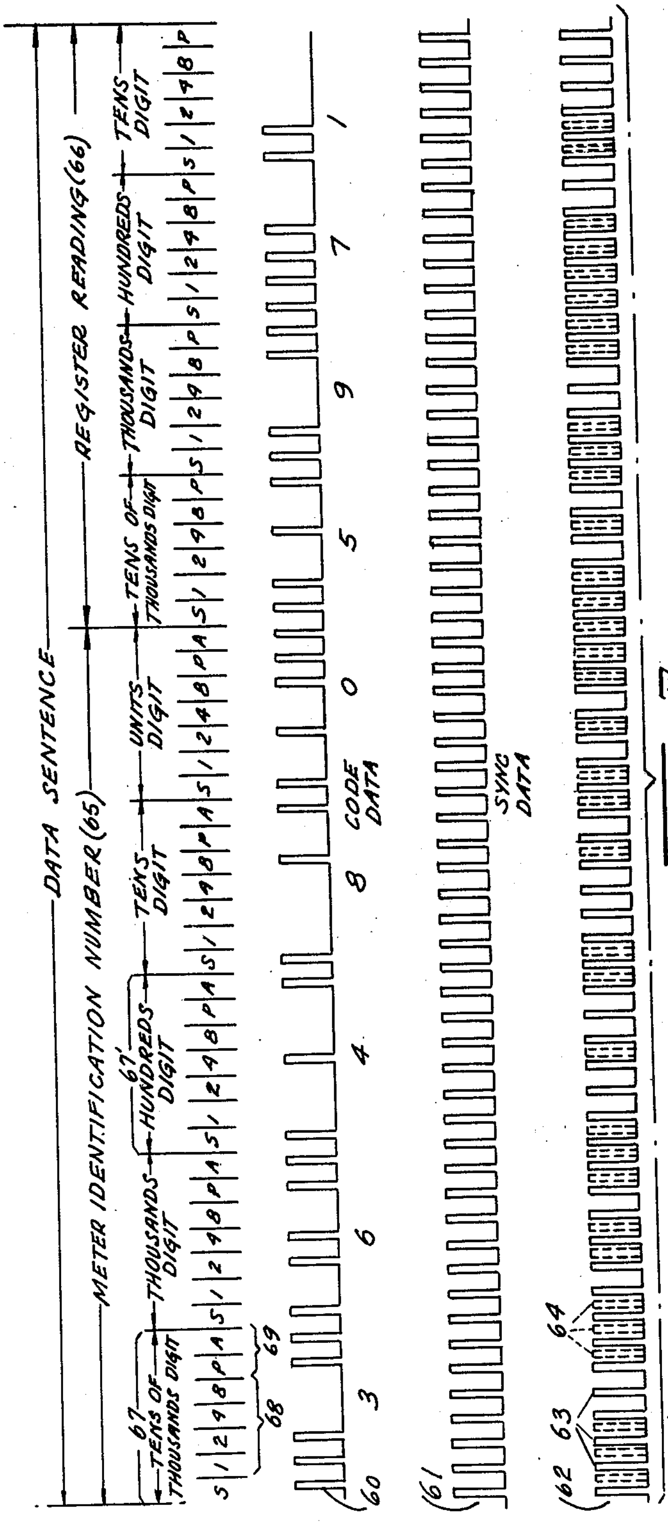
FIGURE 3 shows the wave forms of the pulse train emitted by the transmitter of FIGURES 1 and 2.

The operation of data receiver 70 is as follows:

A coded pulse train, such as pulse train 62, shown in FIGURE 3, is impressed upon the input 71*a* of code separation circuit 71. Code separation circuit 71 separates pulse train 62 (of FIGURE 3) so that the synchronous pulse train 61 of FIGURE 3 appears at output 72 and the code pulse train 60 of FIGURE 3 appears at output 73. Delay means 74 delays the synchronous pulses of synchronous pulse train 61 so that the synchronous pulses follow the code pulses in time sequence. The code pulses appearing on output line 73 are then fed into shift register 75 in serial fashion. The synchronous pulses, such as synchronous pulses 61 of FIGURE 3 are also fed into shift register 75 in serial fashion. The synchronous pulse output appearing on line 72 acts as a source of shift pulses shifting the coded data pulses impressed upon the input of shift register 75 by output line 73 from the left hand end of shift register 75 to the right hand end of shift register 75. At the instant that start pulse S shown in FIGURE 3 is shifted into the right hand most position of shift register 75 the parity check bit T shown in FIGURE 3 is compared against the parity check bit formed in error monitoring and error interlock circuit 76. The parity check bit T represents the count of the binary "one" bits in each character such as the character 67 of FIGURE 3. If the count is an even number such as 0, 2, 4, etc. the parity bit position contains a binary "zero" or no pulse whereas if the bit count is an odd number such as 1, 3, 5, etc. the parity check position contains a binary "one" or positive pulse. For example, character 67 of pulse train 60 shown in FIGURE 3 contains a start pulse S, a "1" pulse and a "2" pulse. This is a total count of three which is an odd count resulting in a parity check bit of binary "one" which represents an odd count. Character 67′ of data pulse train 60 contains a start pulse S and a "4" pulse giving an even count of binary "one" pulses resulting in a binary "zero" or no pulse in the parity bit position P.

Although a binary code with an accompanying parity check bit has been described, it should be understood that the system will operate effectively with other coding arrangements such as a "two out of five" code or a two out of five code with an accompanying ambiguity bit since the type of code employed lends no novelty to the meter reading system.

At the instant that the start pulse S is in the right hand most position of shift register 75 the parity bit P of the binary coded character contained in shift register 75 is compared against the parity check bit formed by the error monitoring and error interlock circuit 76. If there is coincidence between the two parity check bits P this gives an indication that the character which has been received is correct. If there is no coincidence between the parity check bit P in shift register 75 and the parity check bit formed in error monitoring and error interlock circuit 76, error monitoring and error interlock circuit 76 places a binary "one" in the left hand most position 79 of intermediate memory 77. This binary "one" serves to indicate that the character has been received incorrectly. The binary bits representing the character which has just been received by shift register 75 are then transferred to intermediate memory 77. The coded pulses representing the character are then transferred to tape punch 78 together with error indicating bit 79. Intermediate memory 77 energizes the punch solenoids (not shown) of tape punch 78 and also initiates the clutch solenoid (not shown) of tape punch 78. At this instant tape punch 78 then clears shift register 75 in readiness for the receipt of the next binary coded character. Intermediate memory 77 is then cleared by tape punch 78 upon completion of the paper tape punching operation. All subsequent characters of the pulse train are received in the same manner as set forth above.

The operation of the code transmitter as shown in FIGURE 7 is as follows:

The D.C. voltage employed for the voltage breakdown test is applied from the automatic line insulation test circuit to the subscriber line 47. This voltage connects the transmitter 44*c* to its energizing source by means of a solenoid or any other suitable D.C. responsive switch means. The energizing source (not shown) is simultaneously connected to analog digital converter 51, code source 44*c''* impresses the synchronous pulse train 61 of of leads 80 from transmitter 44*c*. Identifying code source 44*c'* then transfers the binary coded meter identification number 65 (see FIGURE 3) to transmitter 44*c*. This coded pulse train is immediately followed by the binary coded meter reading 66 of FIGURE 3. Synchronous pulse source 44*c''* impresses the synchronous pulse train 61 of FIGURE 3 upon transmitter 44*c* which transmits the resultant pulse train 62 of FIGURE 3 through the subscriber line 47 to the receiver 70 (see FIGURE 8) which is located at the central office. Transmitter 44*c* may, for example, consist of a multiposition stepping switch wherein certain of the positions are utilized for the identifying coded pulses and the remaining positions are utilized for the meter reading coded pulses. The sweep arm of the multi-position stepping switch connects each individual position to the transmission medium one at a time, i.e., in serial fashion, until the entire pulse train is transmitted.

FIGURE 4A shows one method of setting up the automatic meter reading system. The transmitters 40 are connected to the automatic line insulation test circuitry 31 through the subscriber lines 47. The test circuitry 31 is connected to data receiver 70 which is similar to that shown in FIGURE 8. The punch tape prepared by data receiver 70 is then read by tape reader 80 and transmitted through data phone transmitter 81 to data processor 15 located at the utility computer and data processing center 10 which calculates the customer billings and places the final tabulations into tape punch 17. Tape punch 17 may be arranged to control a Hollerith card punch unit such as tape-to-card converter 82 which prepares punch cards in a form to be mailed to the individual customer, each card containing the charges for the last service period.

Data may be transferred from the central office directly to the processing center 10 without the preparation of a punch tape document such as shown in FIGURE 4B where data processor 15 is directly connected to data receiver 70 as shown in FIGURE 4B. Although the arrangement shown in FIGURE 4B eliminates the need for a tape reading unit at the central office location 30, the arrangement shown in FIGURE 4*a* has the advantage of being able to store the meter reading at central office 30 at a time when processing center 10 may be processing data from another central office.

Since the automatic line insulation test circuitry does not perform its test sequence regularly throughout the day but rather performs the test sequence at predetermined intervals, it is advantageous to have the meter reading system remain in a de-energized state until the test sequence is initiated. This function is performed by the scanner-to-receiver interlock 83 shown in FIGURE 5, which circuit is electrically connected between the test circuitry 31 and the meter data receiver 70. The operation of the system shown in FIGURE 5 is as follows:

Upon the initiation of the resistance and breakdown voltage test sequence the automatic line fault scanner 31 energizes interlock circuit 83 through lead 84. This occurs as soon as the breakdown voltage is applied to the first subscriber line by line fault scanner 41. The automatic line fault scanner signals the interlock circuit 83 that the voltage breakdown test has been applied. The interlock circuit 83 in response to this signal opens a gate permitting information which is received by line fault scanner 31 to be passed through interlock circuit 83 to data receiver 70. As soon as a complete message has been received or a predetermined period has elapsed the ALIT signals the interlock circuit thereby preventing the data receiver 70 from receiving any information. The automatic line insulation test circuitry to receiver interlock also provides for the timing of the test circuitry in subscriber line to subscriber line progression. To do this the interlock circuit 83 interrupts the pulse source (not shown) for the test circuitry from the time that the interlock circuit's gate device (not shown) is opened to the time that the gate device is reclosed. Thus data receiver 70 is energized only during periods when the automatic line fault scanner is performing the test sequence upon subscriber lines 47. The interlock circuit also locks the scan circuit of test circuitry 31 at one subscriber line position if a plurality of readings are to be taken until such time that the transmission from that line is completed. The interlock circuit 83, however, in no way interferes with the automatic skip circuitry (not shown) of the automatic line insulation test circuitry 31 so that "busy" lines may be skipped in the usual fashion.

FIGURE 6 shows an automatic meter reading system having a plurality of central offices 30 wherein each central office 30 has a data link to the utility office billing and dispatch center 10. The transmitted data received at the dispatch center 10 by receiver 90. The data received is then processed by primary data processing unit 91 which is arranged to transfer correct meter readings to a memory storage means 94 and to transfer incorrect or erroneous meter readings to fault typewriter 92 through output lead 96. The correct meter readings are then withdrawn from memory storage means 94 and processed by billing computer 93 which computes the appropriate rates for each customer and prepares the bills to be mailed to each customer.

The record prepared by fault typewriter 92 is utilized to ascertain which readings must be retransmitted in order to complete the billing for all customers being serviced within the system and also to guide maintenance work.

It should be understood that receiver 90 shown in FIGURE 6 may be designed to include program means for allowing transmission of one central office 30 at a time to dispatch center 10 so that data is not received simultaneously from all central offices. If, however, it is desired to receive data from all central offices simultaneously, dispatch center 10 may be altered in design to include one receiver for each central office 30, each receiver having a memory storage means for storing the data received until the data processor 91 is free to accept more data.

It can be seen from the foregoing that we have provided an automatic meter reading system which permits the use of already existing telephone lines as the communication media between the utility company and the individual meter installation. The unique design of our system permits the initiation of a meter reading request through the subscriber lines without any interference whatsoever with the normal telephone service of the individual subscribers.

In the foregoing, the invention has been described only in connection with preferred embodiments thereof. Many variations and modifications of the principles of the invention within the scope of the description herein are obvious. Accordingly, we prefer to be bound not by the specific disclosure herein contained, but only by the appending claims.

We claim:

1. The method of reading meters each having an indicating dial over a subscriber telephone system having a plurality of subscriber locations comprising the steps of sequentially transmitting a signal over the conventional subscriber telephone lines which is uniquely identifiable as a request for a meter reading and will not ring the subscriber telephone, converting the dial reading of the meter into simultaneous binary information groups in response to said signal, converting the simultaneous binary information groups into a train of serial binary information groups, transmitting the train of serial information groups in response to the meter reading request, receiving the transmitted information groups, converting the received serial information groups into a plurality of simultaneous binary information groups and recording the simultaneous binary information groups.

2. The method set forth in claim 1 wherein the step of transmitting the serial train of binary information groups includes the step of transmitting a second train of binary information groups identifying the particular utility meter being read.

3. An automatic meter reading system having a plurality of subscriber locations for reading a meter having an indicating dial at each location, said system being adapted for use with telephone subscriber line test circuitry having means for sequentially imposing a test signal on said meter reading system, said meter reading system comprising first means for converting the dial position of the meter into groups of binary coded information, all of said groups appearing simultaneously at the output of said converting means, second means connected to said first means for transmitting said binary coded information groups in serial fashion through the associated subscriber line in response to the initiation of the subscriber line test sequence signal, said signal being ineffective to ring a subscriber's telephone handset; third means for receiving the serial binary coded information train from the associated subscriber line, fourth means connected to said third means for converting said serial train of binary coded information into a group of parallel binary coded information groups, fifth means connected to said fourth means for permanently recording said parallel information groups for subsequent use of said coded meter reading.

4. An automatic meter reading system having a plurality of subscriber locations for reading a meter having an indicating dial at each location, said system being adapted for use with telephone subscriber line test circuitry having means for sequentially imposing a test signal on said meter reading system, said meter reading system comprising first means for converting the dial position of the meter in groups of binary coded information, all of said groups appearing simultaneously at the output of said converting means, second means connected to said first means for transmitting said binary coded information in serial fashion through the associated subscriber line in response to the initiation of the subscriber line test sequence, said signal being ineffective to ring a subscriber's telephone handset; third means for receiving the serial train of binary coded information from the associated subscriber line, fourth means connected to said third means for converting said serial train of binary coded information into parallel groups of binary coded information, fifth means connected to said fourth means for permanently recording said parallel information groups for subsequent use of said coded meter reading, sixth means connected to said third means for determining the accuracy of the serial train of binary coded information received by said third means, said fourth means including means connected to said sixth means for recording an error indication in response to an error signal from said sixth means.

5. An automatic meter reading system having a plurality of subscriber locations for reading a meter having an indicating dial at each location, said system being adapted for use with telephone subscriber line test circuitry having means for sequentially imposing a test signal on said meter reading system, said meter reading system comprising first means for converting the dial position of the meter into groups of binary coded information, all of said groups appearing simultaneously at the output of said converting means, second means connected to said first means for transmitting said binary coded information in serial fashion through the associated subscriber line in response to the initiation of the subscriber line test sequence signal, said signal being ineffective to ring a subscriber's telephone handset; third means for receiving the serial train of binary coded information from the associated subscriber line, fourth means connected to said third means for converting said serial train into parallel groups of binary coded information, fifth means connected to said fourth means for permanently recording said parallel information groups, processing means connected to said fifth means for preparing charges in accordance with the transmitted meter readings, card punch means connected to said processing means for producing bills containing the service charges which may be subsequently mailed to the customer.

6. An automatic meter reading system for reading meters having indicating dials, said system being adapted for use with telephone subscriber line test circuitry comprising an analog-to-digital converter for converting the dial position of the meter into a first group of binary coded information, said information appearing simultaneously at the output of said converter means, code producing means for producing a second group of binary coded information identifying the associated meter, each of said first and second binary coded groups containing a parity check bit, transmitting means for transmitting said first and second groups in serial fashion through the associated subscriber line responsive to the initiation of the test sequence signal, said signal being ineffective to ring a subscriber's telephone handset; receiving means for receiving said first and second groups from said associated subscriber line, register means connected to said receiver means for storing a predetermined amount of said information, recording means connected to said register means for recording the contents of said register means in parallel fashion when said register means contains said predetermined amount of information pulses, error indicating means connected to said receiving means for generating a signal responsive to an error appearing in the serial information train.

7. An automatic meter reading system for reading meters having indicating dials, said system being adapted for use with telephone subscriber line test circuitry comprising an analog-to-digital converter for converting the dial position of the meter into a first group of binary coded information, said information appearing simultaneously at the output of said converter means, code producing means for producing a second group of binary coded information identifying the associated meter, each of said first and second binary coded information groups containing a parity check bit, transmitting means for transmitting said first and second information groups in serial fashion through the associated subscriber line responsive to the initiation of the test sequence signal, said signal being ineffective to ring a subscriber's telephone handset; receiving means for receiving said first and second information groups from said associated subscriber line, register means connected to said receiver means for storing a predetermined amount of said received information, recording means connected to said register means for recording the contents of said register means in parallel fashion when said register means contains said predetermined amount of information, error indicating means connected to said receiving means for generating a signal responsive to an error appearing in the serial information train, said error indicating means including means to generate a parity check bit for each of said groups and coincidence means for comparing said generated parity check bit with said transmitted parity check bit, said recording means including means connected to said error indicating means to record an error indication in response to an error signal from said error indicating means.

8. An automatic meter reading system for reading meters having indicating dials, said system being adapted for use with telephone subscriber line test circuitry and comprising an analog-to-digital converter for converting the dial position of the meter into a first group of binary information, said binary information appearing simultaneously at the output of said converter means, code producing means for producing a second group of binary information identifying the associated meter, transmitting means for transmitting said first and second groups in serial fashoin through the associated subscriber line responsive to the initiation of the test sequence signal by said test circuits, said signal being ineffective to ring a subscriber's telephone handset; receiving means for receiving said first and second groups from said associated subscriber line, register means connected to said receiver means for storing a predetermined amount of said received information, recording means connected to said register means for recording the contents of said register means in parallel fashion when said register means contains said predetermined amount of information, said register means including intermediate storage means connected to said recording means for transferring the contents of said register means to said recording means, said recording means including means for clearing the contents of said register means when said pulse group has been recorded.

9. An automatic meter reading system for reading meters having indicating dials, said system being adapted for use with telephone subscriber line test circuitry comprising an analog-to-digital converter for converting the dial position of the meter into a first group of binary information, said information appearing simultaneously at the output of said converter means, code producing means for producing a second group of binary information identifying the associated meter, transmitting means for transmitting said first and second groups in serial fashion through the associated subscriber line responsive to the initiation of the test sequence signal by said test circuits, said signal being ineffective to ring a subscriber's telephone handset; receiving means for receiving said first and second groups from said associated subscriber line, register means connected to said receiver means for storing a predetermined amount of said received information, recording means connected to said register means for recording the contents of said register means in parallel fashion when said register means contains said predetermined amount of information, said transmitter means including means for generating a plurality of synchronizing pulses and means for combining said binary information with said synchronizing pulses.

10. An automatic meter reading system for reading meters having indicating dials, said system being adapted for use with telephone subscriber line test circuitry comprising an analog-to-digital converter for converting the dial position of the meter into a first group of binary information, said pulses appearing simultaneously at the output of said converter means, code producing means for producing a second group of binary information identifying the associated meter, transmitting means for transmitting said first and second groups in serial fashion through the associated subscriber line responsive to the initiation of the test sequence signal by said test circuits, said signal being ineffective to ring a subscriber's telephone handset; receiving means for receiving said first and second groups from said associated subscriber line, register means connected to said receiver means for storing a predetermined amount of said received information, recording means connected to said register means for recording the contents of said register means in parallel fashion when said register means contains said predetermined amount of information, said transmitter means including means for generating a plurality of synchronizing pulses and means for combining said binary information with said synchronizing pulses, said receiver means including means for separating said binary information from said synchronizing pulses, said register means including means for receiving said synchronizing pulses to shift said binary information into said register means.

11. An automatic central information gathering system comprised of a central point and a plurality of remote locations each having a telephone handset, said central point being electrically connected to each of said remote locations by conductor means having a primary function of transmitting coded information from one remote location to another through said central point, test equipment located at said central point to sequentially impose the identical test signal on said conductors to determine continuity between said central point and said remote locations through the associated conductors, said test signal being unable to ring the telephone handset, information means located at each of said plurality of remote locations for transmitting information over said conductors to said central point in response to said test signal, said information including the identifying code of the remote location energized.

12. An automatic central information gathering system comprised of a central point and a plurality of remote locations each having a telephone handset, said central point being electrically connected to each of said remote locations by conductor means having a primary function of transmitting coded information from one remote location to another through said central point, test equipment located at said central point to sequentially impose the identical test signal on said conductors to determine continuity between said central point and said remote locations through the associated conductors, information means located at each of said plurality of remote locations for transmitting information over said conductors to said central point in response to said test signal, said test signal unable to ring the telephone handset, said test signal being impressed on said conductors for a substantially brief time interval, said information including the identifying code of the remote location energized, said test signal and said information reply being transmitted over said conductors substantially within said time interval thereby preventing interference with said test sequence.

13. An automatic central information gathering system comprised of a central point and a plurality of remote locations each having a telephone handset, said central point being electrically connected to each of said remote locations by conductor means having a primary function of transmitting coded information from one remote location to another through said central point, test equipment located at said central point to sequentially impose the identical test signal on said conductors to determine continuity between said central point and said remote locations through the associated conductors, said test signal being unable to ring the telephone handset, information means located at each of said plurality of remote locations for transmitting information over said conductors to said central point in response to said test signal, said information including the identifying code of the remote location energized, said test signal being impressed on said conductors for a substantially brief time interval, said test signal and said information reply being transmitted over said conductors substantially within said time interval thereby preventing interference with said test sequence, each of said remote locations having a plurality of information sources, said information means including means to transmit data from each of said sources during the interval of said test signal.

14. An automatic central information gathering system comprised of a central point and a plurality of remote locations each having a telephone handset, said central point being electrically connected to each of said remote locations by conductor means having a primary function of transmitting coded information from one remote location to another through said central point, test equipment located at said central point to sequentially impose the identical test signal on said conductors to determine continuity between said central point and said remote locations through the associated conductors, said test signal being unable to ring the telephone handset, information means located at each of said plurality of remote locations for transmitting information over said conductors to said central point in response to said test signal, said information including the identifying code of the remote location energized, each of said remote locations having at least one information source, information transfer means at at least one of said remote locations including first means connected to information sources of a plurality of said remote locations for transmitting information from the associated information sources to said central point enabling the transmission of information from a plurality of remote locations upon the initiation of a test signal to only said information means having said first means included therein.

15. An automatic central information gathering system comprised of a central point and a plurality of remote locations each having a telephone handset, said central point being electrically connected to each of said remote locations by conductor means having a primary function of transmitting coded information from one remote location to another through said central point, scanning means located at said central point to selectively impose a signal on said conductors, said test signal unable to ring the telephone handset, information means located at each of said plurality of remote locations for transmitting information over said conductors to said central point in response to said signal, said information including the identifying code of the remote location energized, each of said remote locations having an audio transmitter and receiver connected to an associated conductor, said scanning means signals and said information signals being transmitted independently of the transmitting of said audio transmitters and receivers, said scanning means including means to prevent initiation of said scanning signal upon a conductor in response to the operation of the audio transmitter associated with said conductor.

References Cited in the file of this patent

UNITED STATES PATENTS

| | | |
|---|---|---|
| 2,550,820 | Kessler | May 1, 1951 |
| 2,788,392 | Krahulec | Apr. 9, 1957 |
| 2,870,258 | Cooper | Jan. 20, 1959 |
| 2,957,046 | Freeman | Oct. 18, 1960 |
| 2,993,194 | Derr | July 18, 1961 |
| 3,045,210 | Langley | July 17, 1962 |
| 3,047,662 | Smith | July 31, 1962 |
| 3,072,894 | Chapin | Jan. 8, 1963 |